United States Patent
Mattes et al.

[11] Patent Number: 5,730,925
[45] Date of Patent: Mar. 24, 1998

[54] METHOD AND APPARATUS FOR PRODUCING A THREE-DIMENSIONAL OBJECT

[75] Inventors: Thomas Mattes, Hechendorf; Andreas Lohner, Haar; Christian Wilkening, Diessen/Ammersee, all of Germany

[73] Assignee: EOS GmbH Electro Optical Systems, Planegg, Germany

[21] Appl. No.: 634,171

[22] Filed: Apr. 18, 1996

[30] Foreign Application Priority Data

Apr. 21, 1995 [DE] Germany .................. 195 14 740.5

[51] Int. Cl.⁶ .................. B29C 35/08; B29C 41/02
[52] U.S. Cl. .................. 264/497; 219/121.73; 219/121.85; 264/113; 264/308; 419/38; 419/44; 425/78; 425/135; 425/174.4
[58] Field of Search .................. 264/113, 308, 264/497; 425/78, 135, 174.4; 219/121.73, 121.85; 419/1, 38, 44

[56] References Cited

U.S. PATENT DOCUMENTS

| | | | |
|---|---|---|---|
| 4,938,816 | 7/1990 | Beaman et al. | 264/497 X |
| 5,238,614 | 8/1993 | Uchinono et al. | 264/401 |

FOREIGN PATENT DOCUMENTS

| | | |
|---|---|---|
| 361847 | 4/1990 | European Pat. Off. . |
| 94 00 372.6 | 5/1994 | Germany . |
| 93 19 561.3 | 6/1994 | Germany . |
| 4300478 | 8/1994 | Germany . |
| WO88/02677 | 4/1988 | WIPO . |
| WO 90/03893 | 4/1990 | WIPO . |
| 450 762 | 10/1991 | WIPO . |
| WO 94/26446 | 11/1994 | WIPO . |

*Primary Examiner*—Leo B. Tentoni
*Attorney, Agent, or Firm*—George W. Neuner

[57] ABSTRACT

In an apparatus for producing a three-dimensional object by laser sintering the object is produced by successive solidification of layers of a powder material at points corresponding to a cross-section of said object using radiation for solidifying said powder material. The apparatus includes a support having a substantially plane upper side for supporting the object, a material applying device for applying a layer of the material onto the upper side or onto another layer formed on the upper side, and a solidification device for solidifying a layer of the material by irradiation. The material applying device has a coating device and a drive for displacing the coating device in a direction parallel to the upper side of the support. The coating device has a first side face, a second side face, a base surface parallel to the upper side and facing the same, a first edge portion between the first side face and the base surface, the first edge portion including a first angle of inclination with the base surface, and a second edge portion between the second side face and the base surface, the second edge portion including a second angle of inclination with the base surface, the second angle of inclination being smaller than the first angle of inclination.

22 Claims, 5 Drawing Sheets

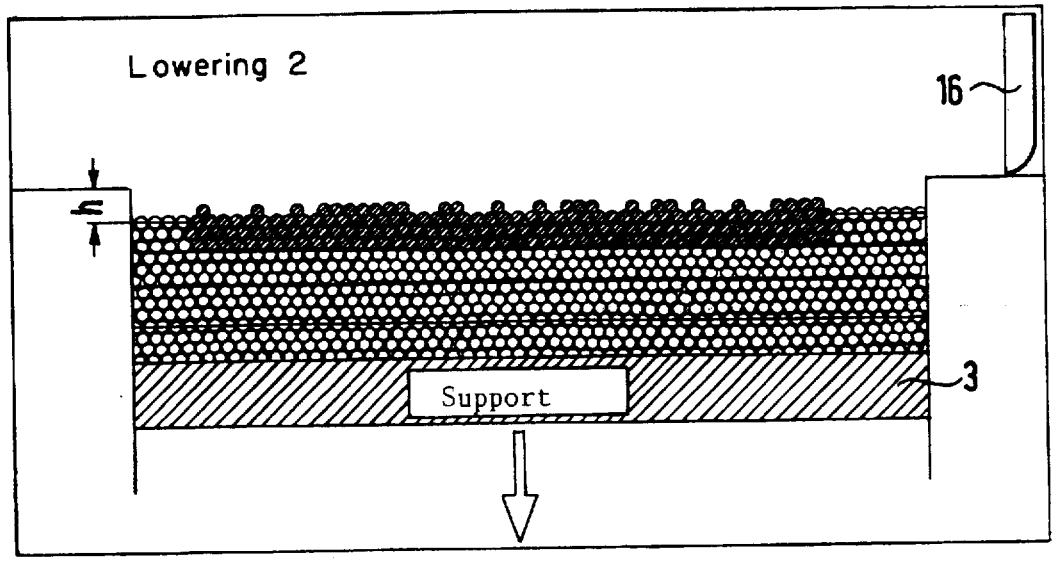
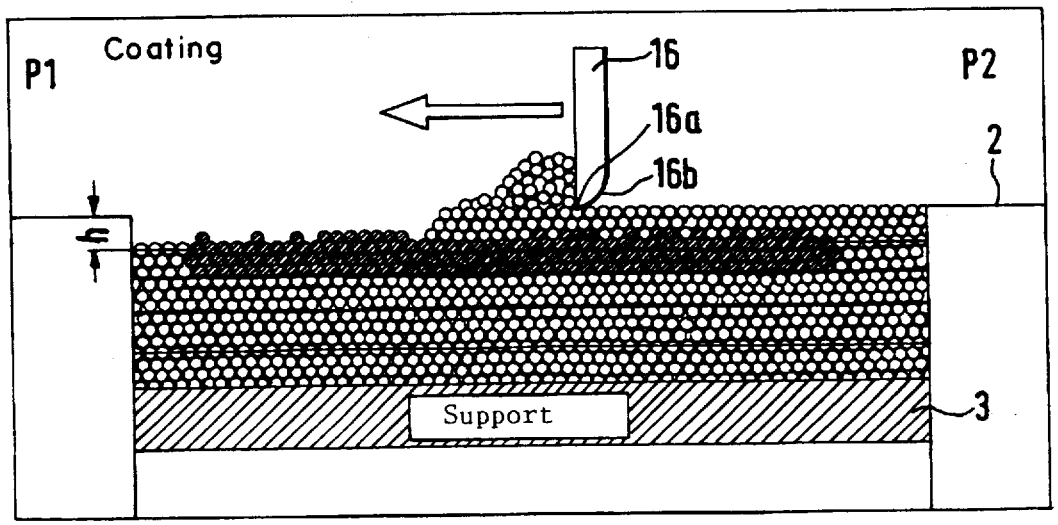

Start

Smoothing

Material Supply

Applying

Scanning

METHOD AND APPARATUS FOR PRODUCING A THREE-DIMENSIONAL OBJECT

BACKGROUND OF THE INVENTION

The invention relates to an apparatus for producing a three-dimensional object by laser sintering, whereby the object is produced by successive solidification of layers of a powder material at points corresponding to a cross-section of the object using radiation for solidifying the powder material. The invention further relates to a corresponding method of producing a three-dimensional object.

A method for producing a three-dimensional object known as "selective laser sintering" and a corresponding apparatus for carrying out the method are disclosed in document WO 88/02677. In this method a three-dimensional object is produced by successive solidification or sintering, resp., of layers of a powdery building material at places corresponding to the respective cross-section of the object using electromagnetic radiation. The known apparatus uses a rotating drum for distributing and smoothing the powder material for forming a layer for subsequent solidification.

German Patent 43 00 478 discloses an apparatus and a method for producing a three-dimensional object by laser sintering whereby the powder is applied and smoothed using a coating device.

However, this known method experiences the problem that owing to the high surface tension of the powder a non-uniform rough surface is formed when sintering metal powder using a laser beam. Sintered powder particles can project beyond the layer just scanned with the laser beam to such an extent that a problem-free application of the following layer is not possible, because the wiper used for applying the layer catches on those particles or tears off the same. This may even cause breaking of the entire part, if it has filigree structures. Further, the projecting particles also considerably reduce the surface quality of the respective layer.

Document EP-A-0 361 847 discloses a method and an apparatus for producing a three-dimensional object by successive solidification of layers of a liquid material which is polymerized using electromagnetic radiation. A rigid doctor blade is used for smoothing a layer of the material before solidification thereof. The lower edge of the doctor blade is provided with inclined edges including an angle of inclination of between 5 and 8 degrees with respect to the surface of the liquid. This inclination is said to prevent turbulence and bubble formation in the liquid below the blade when smoothing the layer.

OBJECTS OF THE INVENTION

It is the object of the invention to provide an improved apparatus for producing a three-dimensional object by laser sintering and a corresponding improved method. It is a further object of the invention to provide a method and an apparatus which improves the surface quality of a solidified layer and of the object. It is a still further object of the invention to provide a method and apparatus which allows for a problem-free application of the following layer of material.

SUMMARY OF THE INVENTION

In order to achieve the above-mentioned objects the invention provides an apparatus for producing a three-dimensional object by laser sintering, whereby the object is produced by successive solidification of layers of a powder material at points corresponding to a cross-section of the object using radiation for solidifying the powder material, the apparatus comprising support means having a substantially plane upper side for supporting the object, a material applying device for applying a layer of the material onto the upper side or onto another layer formed on the upper side, the material applying device comprising a coating device and a drive for displacing the coating device in a direction parallel to the upper side of the support means, the coating device having a first side face, a second side face, a base surface parallel to the upper side and facing the same, a first edge portion between the first side face and the base surface, the first edge portion having a first slope with respect to the base surface, and a second edge portion between the second side face and the base surface, the second edge portion having a second slope with respect to the base surface, the second slope being smaller than the first slope, and a solidificaton device for solidifying a layer of the material by irradiation.

The invention also provides a method of producing a three-dimensional object by successive solidification of layers of a building material at points corresponding to respective cross-sections of the object by irradiation, the method comprising the following steps:

a) forming and solidifying a layer of the building material;

b) smoothing and compacting the solidified layer;

c) applying the building material to the solidified layer;

d) solidifying the applied material at points corresponding to a respective cross-section of the object; and e) repeating steps b) to d) for forming subsequent layers of the building material.

BRIEF DESCRIPTION OF THE DRAWINGS

Further advantages, features and objects of the invention will be apparent from the following description of exemplary embodiments with reference to the drawings, wherein

FIGS. 4a–4e show the individual process steps in schematic representation in connection with an exaggerated layer surface.

DESCRIPTION OF PREFERRED EMBODIMENTS

Figure 1:
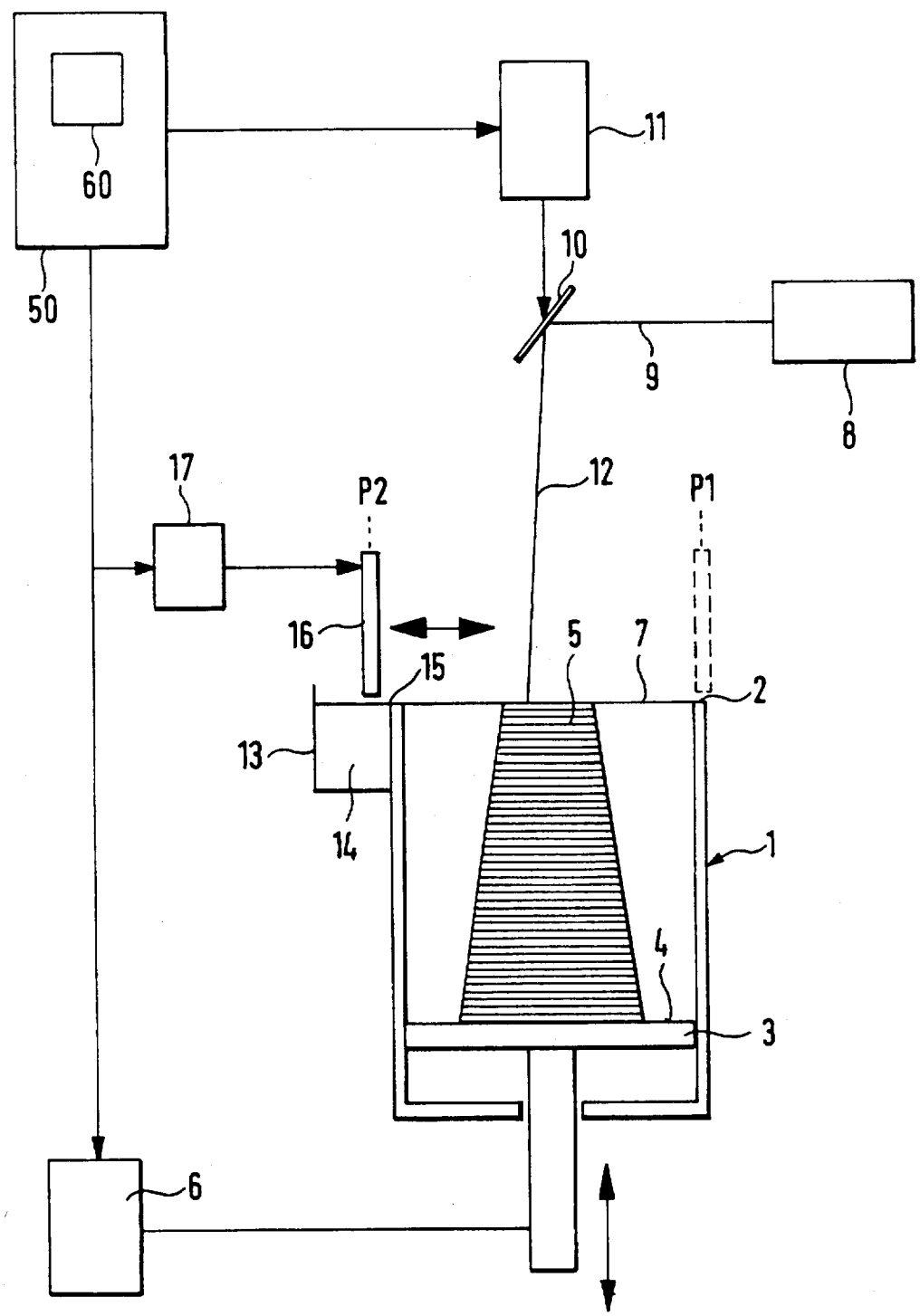
FIG. 1 is a schematic side view of the apparatus in partially sectional representation.

As best shown in FIG. 1 the apparatus for producing a three-dimensional object using laser sintering comprises a container 1 having an open top and an upper edge 2. A support 3 having a substantially plane upper side 4 aligned parallel with the upper edge 2 is disposed in the container for supporting an object 5 to be formed. The object 5 which is constituted in the manner described below by solidifying a plurality of layers of a powdery building material 14 extending parallel to the upper side 4 of the support using electromagnetic radiation, is placed on the upper side of the support 3. The support 3 can be displaced in vertical direction, i.e. parallel to the sidewalls of the container and perpendicular to the upper side 4 of the support, by means of an elevation adjustment device 6. Thus, the position of the support 3 relative to the upper edge 2 of the container can be adjusted. A working plane 7 is defined by the upper edge 2 of the container.

A solidification device 8 for solidifying the uppermost layer of the object to be formed adjacent to the working plane 7 is disposed above the container 1. The solidification device comprises a radiation source formed as a laser which generates a directed light beam 9. A deflection mirror 10 is suspended on gimbals substantially centrally above the container 1. The deflection mirror 10 can be oriented by a schematically indicated pivoting device 11 so that the directed light beam 9 is reflected by the mirror 10 and this reflected light beam 12 can be directed to substantially any point of the working plane 7.

A reservoir 13 for the building material 14 has an open top and is mounted laterally at the container 1. The side of the reservoir adjacent to the container wall has an upper edge 15 which is flush with the upper edge 2 of the container. The reservoir is filled with the powdery building material 14, which preferably consists of metal powder, to an extent that the powder always projects slightly beyond the upper edge 15 adjacent to the container wall. For this purpose the reservoir 13 comprises a vertically displaceable bottom (not shown in FIG. 1) which can be stepwise raised after revomming powder for coating a layer so that the fill level of the powder is again above the upper edge 15.

A material applying device comprising a coating device 16 shown schematically in FIG. 1 is arranged above the container 1. The coating device 16 extends substantially across the open top of the container 1 and the lower edge of the coating device 16 is within the working plane 7. A displacement device 17 is provided for displacing the coating device 16 in a plane parallel to the working plane 7 and parallel to the upper side 4 of the support 3, resp. The displacement device 17 is arranged to displace the coating device 16 from a position P1 on the side of the container 1 opposite to the reservoir to a position P2 above the reservoir and back with an adjustable, variable speed.

Figure 2:
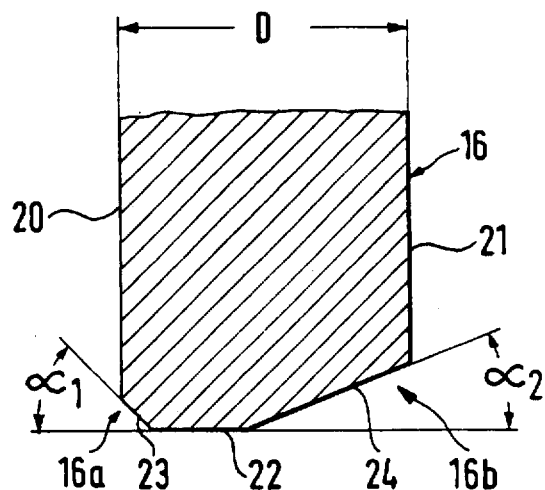
FIG. 2 is a cross-section through a first embodiment of the coating device.

A first embodiment of the coating device 16 shown in FIG. 2 comprises a first side face 20, a second side face 21 parallel thereto, both side faces extending substantially perpendicular to the upper side 4 of the support 3, and a base surface 22 extending parallel to the upper side 4 of the support 3 and lying in the working plane 7. The first side face 20 and the second side face 21 are spaced from each other by a distance D of about 10 mm. The first side face 20 and the base surface 22 define therebetween a first edge portion 16a formed by a plane surface 23 extending obliquely with respect to the first side face and the base surface. The surface 23 includes an angle $\alpha_1$ of preferably about 60° with the plane comprising the base surface 22. The second side face 21 and the base surface 22 define therebetween a second edge portion 16b formed by a plane surface 24 which includes an angle $\alpha_2$ of preferably 30° with the plane comprising the base surface 22. Thus, the coating device 16 has an asymmetric cross-section in a plane perpendicular to the working plane 7 and parallel to its displacement direction, whereby the first edge portion 16a forms a defined coating edge with a bezel having an angle $\alpha_1$ and the second edge portion 16b forms a smoothing edge having a second bezel with an angle $\alpha_2$. The angle $\alpha_1$ is larger than the angle $\alpha_2$.

Figure 3:
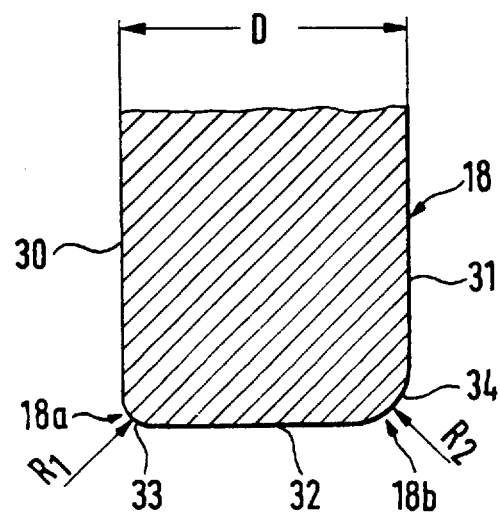
FIG. 3 is a cross-section through a further embodiment of the coating device.

In the embodiment shown in FIG. 3 the coating device 18 as well comprises a first side face 30 and a second side face 31, whereby both side faces are parallel and extend perpendicular to the displacement direction of the coating device 18, and a base surface 32 extending parallel to the upper side 4 of the support and lying within the working plane 7. In this embodiment the first edge portion 18a extending between the first side face 30 and the base surface 32 comprises a curved surface 33 having a radius of curvature $R_1$ of preferably about 3 mm. The second edge portion 18b defined by the second side face 31 and the base surface 32 comprises a curved surface 34 having a radius of curvature $R_2$ of preferably about 10 mm. Thus, the first curved surface 33 forms a defined coating edge for applying the material and the second curved surface 34 forms a smoothing edge for smoothing and compacting the solidified material on a layer.

The coating devices 16, 18 are formed of a rigid material, in particular of metal or of a heat-resistant resin.

The coating devices 16 or 18, resp., are arranged in the apparatus of FIG. 1 so that the first edge portion 16a, 18a faces the end of the container 1 opposite to the reservoir 13 and the second edge portion 16b, 18b faces the reservoir 13.

The displacement device 17, the elevation adjustment device 6 and the pivoting device 11 are all connected with a central control unit 50 for central and coordinated control thereof. The control unit 50 further comprises a processor 60.

The control unit 50 is adapted to control the displacement device 17 so that the coating device 16 is moved from the position P2 above the reservoir 13 in direction of its first edge portion 16a across the support 3 or a previously solidified layer for applying a new layer of the material into the position P1 at the end of the container opposite to the reservoir 13. The control unit 50 is further adapted to move the coating device 16 after solidification of a layer of the object 5 from the position P1 into the position P2 so that the second edge portion 16b strikes across the solidified layer.

Modifications of the described apparatus are possible. The angle $\alpha_1$ can have values between about 30° and about 90°. The angle $\alpha_2$ may have values between about 1° and about 60°. The preferred range is between 60° and 70° for $\alpha_1$ and between 20° and 30° for $\alpha_2$. The radius of curvature $R_1$ may have values between approximately 0 mm and about 3 mm, the radius of curvature $R_2$ may have values between about 1 mm and 10 mm. The preferred range is between 1 mm and 3 mm for $R_1$ and between 5 mm and 10 mm for $R_2$.

Combinations between a rounded surface for the first edge portion and an oblique or inclined surface for the second edge portion and vice versa are also possible. It is essential that the first edge portion defining the coating edge has a greater slope or gradient with respect to the base surface than the second edge portion provided for smoothing and compacting a solidified layer.

It is not necessary that the solidifying device comprises a laser; any other source of electromagnetic radiation or for particle radiation having sufficient energy for sintering the powder may be used.

The method of producing the three-dimensional object by means of laser sintering comprises the following steps.

In operation of the apparatus a preliminary step is to generate and store in the computer 60 coupled to the control unit 50 data describing the shape of the object 5 using a design program or the like. For producing the object 5 these data are processed by decomposing the object into a multiplicity of horizontal layers having a thickness which is small compared with the size of the object, for example 0.1 to 1 mm, and the configuration data of each layer are provided.

In a first step the support 3 is moved in a position within the container 1 so that its upper side 4 is below the upper edge 2 of the container by a distance h corresponding to the desired layer thickness. At this time the coating device is in its starting position P1 at the side opposite to the reservoir and moved from this position into its position P2 above the reservoir. Thereafter a first layer of the material 14 is applied to the upper side 4 of the support using the coating device 16. In the course of this the coating device 16 departing from its position P2 pushes the material 14 with the first edge portion 16a from the reservoir 13 into the hollow space between the upper side 4 of the support 3 and the upper edge 2 of the container. After completion of this first coating step the coating device is in its position P1 opposite to the reservoir. Thereupon the control unit 50 controls the pivoting device 11 so that the deflected beam 12 strikes the points of the layer corresponding to the cross-section of the object and sinters or solidifies, resp., the material at these points.

Owing to the high surface tension of the powder the solidified layer has a non-uniform or rough surface. The projecting solidified powder particles are weakly bonded to the already solidified porous surface therebelow.

Thereafter the steps schematically shown in the FIGS. 4a to 4e or 5a–5e, resp., are carried out for each subsequent layer.

Figure 4A:
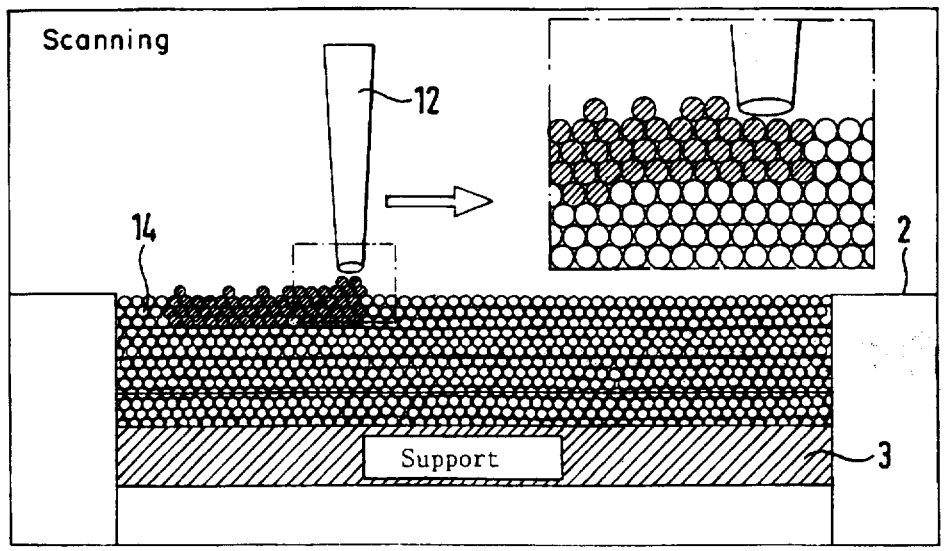
Figure 5A:
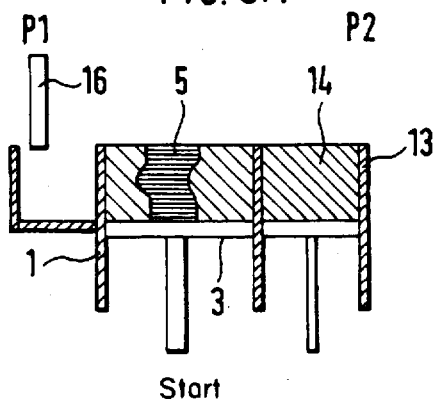
FIGS. 5a–5e are a further schematic representation of the individual process steps.

In any case it is started from a scanned layer (FIG. 4a). The coating device is in its position P1 on the side opposite to the reservoir (FIG. 5a).

Figure 4B:
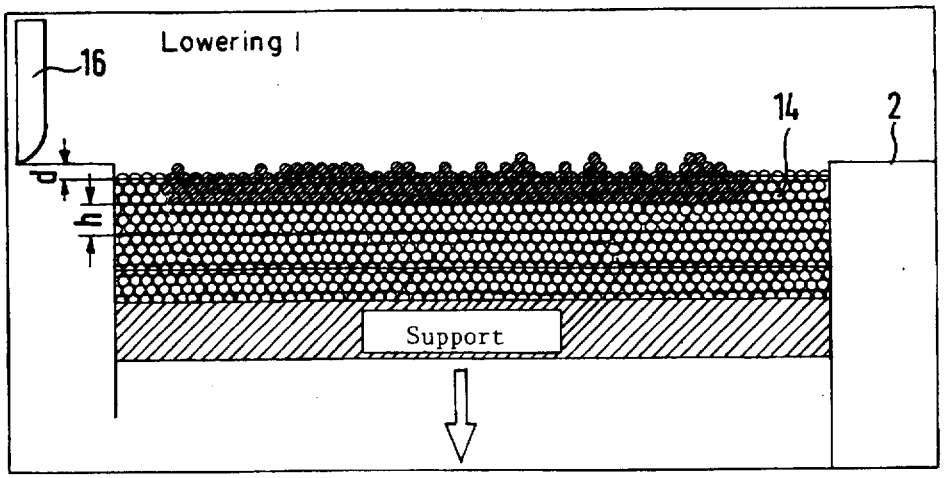

After scanning the layer the support 3 is lowered by a predetermined extent which may be between 0 and the layer thickness h (FIG. 4b).

Figure 4C:
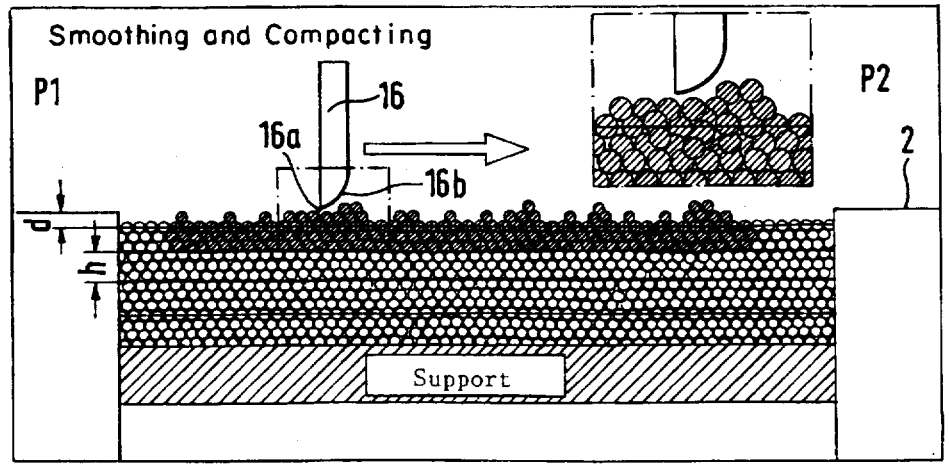
Figure 5B:
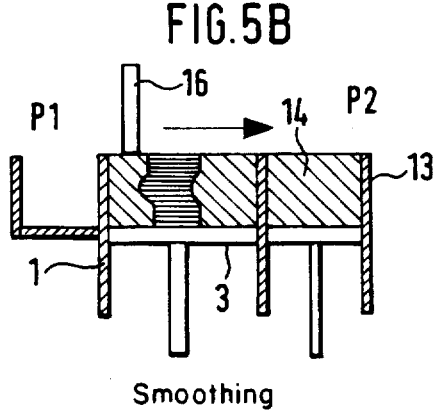

For preparing the application of a new layer the coating device is moved from its position P1 opposite to the reservoir 13 across the scanned layer towards the reservoir 13 with a leading second edge portion, i.e. the side having the greater bezel or radius of curvature, resp. This smoothes and compacts the surface of the solidified powder (FIG. 4c, FIG. 5b). The coating device does not completely remove the projecting particles, but mechanically deforms the same to generate a plane surface. The projecting particles are pressed into the pores therebelow, whereby the surface is compacted.

Figure 5C:
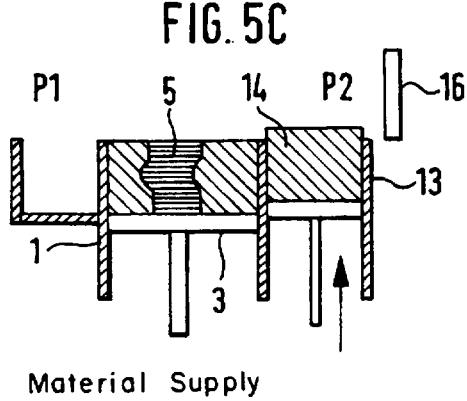
Figure 5D:
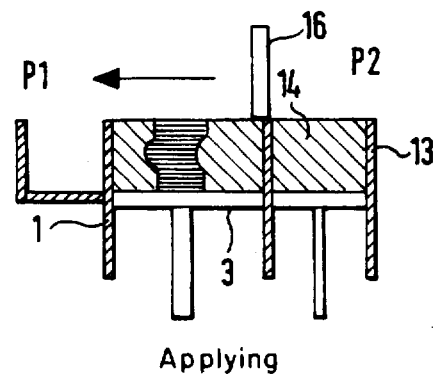

As shown in FIG. 4d the support 3 is then lowered by the predetermined layer thickness h (FIG. 4d). The displaceable bottom of the reservoir is lifted by such an extent that the filling level of the material 14 is again above the upper edge of the reservoir (FIG. 5c).

Figure 5E:
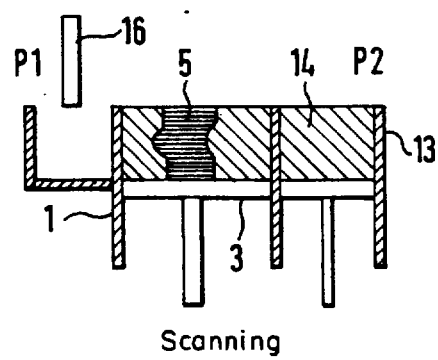

Thereupon a new layer of the material 14 is applied to the previously formed layer by moving the coating device 16 which pushes the material with the first edge portion 16a from the reservoir 13 across the solidified and smoothed layer (FIG. 4e). Thereafter the layer is scanned at the points corresponding to the object (FIG. 4a, FIG. 5e).

The above-described steps are repeated until the object 5 is completed. Thereafter the support is moved out of the container so that the object can be removed. Thereafter the object is cleaned from adhering remainders of the powder.

Although the invention has been described with reference to specific example embodiments, it is to be understood that it is intended to cover all modifications and equivalents within the scope and spirit of the appended claims.

What is claimed is:

1. An apparatus for producing a three-dimensional object by laser sintering, whereby said object is produced by successive solidification of layers of a powder material at points corresponding to a cross-section of said object using radiation for solidifying said powder material, said apparatus comprising support means having a substantially plane upper side for supporting said object, a material applying device for applying a layer of said material onto said upper side or onto another layer formed on said upper side, said material applying device comprising a coating device and a drive for displacing said coating device in a direction parallel to said upper side of said support means, said coating device having a first side face, a second side face, a base surface parallel to said upper side and facing the same, a first edge portion between said first side face and said base surface, said first edge portion having a first slope with respect to said base surface, and a second edge portion between said second side face and said base surface, said second edge portion having a second slope with respect to said base surface, said second slope being smaller than said first slope, and a solidification device solidifying a layer of said material by irradiation.

2. The apparatus of claim 1, wherein said first and second edge portions each comprise a plane surface including an angle of inclination ($\alpha_1$, $\alpha_2$) with the plane of said base surface corresponding to said first and second slope, respectively.

3. The apparatus of claim 2, wherein said angle ($\alpha_1$) corresponding to said first slope is in the range between about 60° and 70° and the angle ($\alpha_2$) corresponding to said second slope is in the range between about 20° and 30°.

4. The apparatus of claim 2, wherein said angle ($\alpha_1$) corresponding to said first slope is about 60° and said angle ($\alpha_2$) corresponding to said second slope is about 30°.

5. The apparatus of claim 1, wherein said first and second edge portions each comprise a curved surface joining said base surface with the corresponding one of said side surfaces and having a radius of curvature ($R_1$, $R_2$) corresponding to said first and second slope, respectively, whereby a first radius of curvature ($R_1$) corresponding to said first slope is smaller than a second radius of curvature ($R_2$) corresponding to said second slope.

6. The apparatus of claim 5, wherein said first radius of curvature ($R_1$) is between about 0 mm and about 3 mm and the second radius of curvature ($R_2$) is between about 5 mm to about 10 mm.

7. The apparatus of claim 6, wherein said first radius of curvature ($R_1$) is about 3 mm and said second radius of curvature ($R_2$) is about 10 mm.

8. The apparatus of claim 1, wherein said first edge portion comprises a plane surface extending between said base surface and said first side face and said second edge portion comprises a curved surface extending between said base surface and said second side face.

9. The apparatus of claim 1, wherein said first edge portion comprises a curved surface extending between said base surface and said first side face and said second edge portion comprises a plane surface extending between said base surface and said second side face.

10. The apparatus of claim 1, comprising a reservoir for said powder material above said support, said first edge portion being on a side of said coating device opposite to said reservoir.

11. The apparatus of claim 10, wherein said second edge portion is on the side of said coating device facing said reservoir.

12. The apparatus of claim 10, comprising a control means for driving said coating device in a direction parallel to said upper side of said support means with said first edge portion being on a leading side from a second position above said reservoir into a first position opposite to said reservoir for applying material onto said support means or onto a previously formed layer.

13. The apparatus of claim 12, comprising control means for driving said coating device from said first position into said second position with a leading second edge portion after solidifying said applied layer.

14. The apparatus of claim 1, wherein said coating device is made of a rigid material.

15. The apparatus of claim 1, wherein said first and second side face are each substantially perpendicular to said base surface.

16. A method for producing a three-dimensional object by laser sintering using an apparatus according to claim 1, said method comprising the following steps:
 a) forming and solidifying a first layer of said material;
 b) smoothing and compacting said first layer by moving said coating device across said layer in a direction defined by said second edge portion parallel to said upper side of said support means;
 c) applying said material onto said first layer by moving said coating device parallel to said upper side of said support means in a direction defined by said first edge portion;
 d) solidifying said applied layer of said material at points corresponding to a respective cross-section of said object; and
 e) repeating steps b) to d) for forming subsequent layers of said object to produce said three-dimensional object.

17. The method of claim 16, comprising lowering said support means before the smoothing and compacting step by a distance being in the range between 0 and the desired layer thickness.

18. The method of claim 16, comprising lowering said support means to a level corresponding to a desired layer thickness before applying said material.

19. A method of producing a three-dimensional object by successive solidification of layers of a building material at points corresponding to a cross-section of said object by irradiation, said method comprising the following steps:
 a) forming and solidifying a layer of said material;
 b) smoothing and compacting said solidified layer;
 c) applying said building material to said solidified layer;
 d) solidifying said applied material at points corresponding to a respective cross-section of said object; and
 e) repeating steps b) to d) for forming subsequent layers of said object to produce said three-dimensional object.

20. The apparatus of claim 1, comprising a reservoir for said powder material, said first edge portion being on a side of said coating device opposite to said reservoir.

21. The apparatus of claim 20, comprising a control means for driving said coating device, in a direction parallel to said upper side of said support means with said first edge portion being on a leading side, from a second position above said reservoir into a first position opposite to said reservoir for applying material onto said support means or onto a previously formed layer.

22. The apparatus of claim 1, wherein said coating device is made of metal.

* * * * *